June 23, 1970 R. COURNUT 3,516,403
INTRAUTERINE CONTRACEPTION DEVICE AND INSTRUMENT
FOR PLACING THIS DEVICE IN POSITION
Filed July 5, 1968 2 Sheets-Sheet 1

June 23, 1970 R. COURNUT 3,516,403
INTRAUTERINE CONTRACEPTION DEVICE AND INSTRUMENT
FOR PLACING THIS DEVICE IN POSITION
Filed July 5, 1968 2 Sheets-Sheet 2
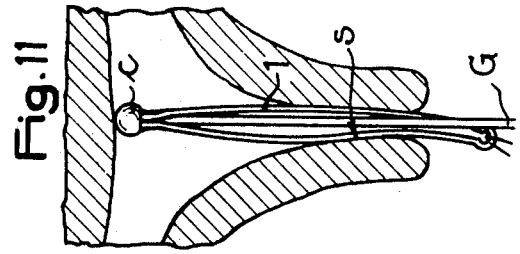
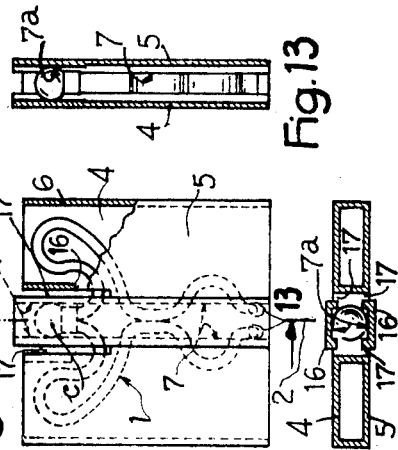
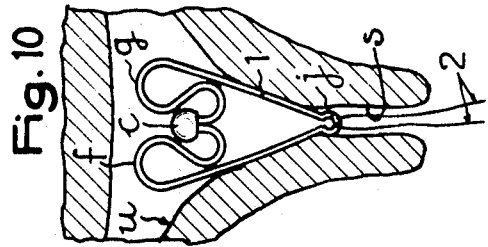
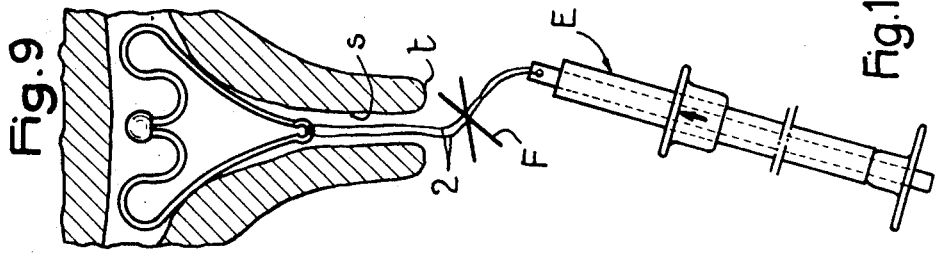
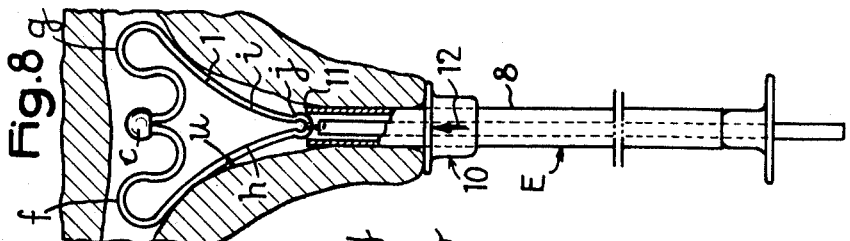
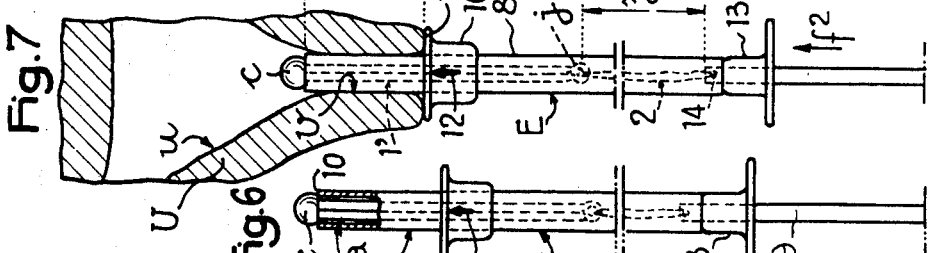
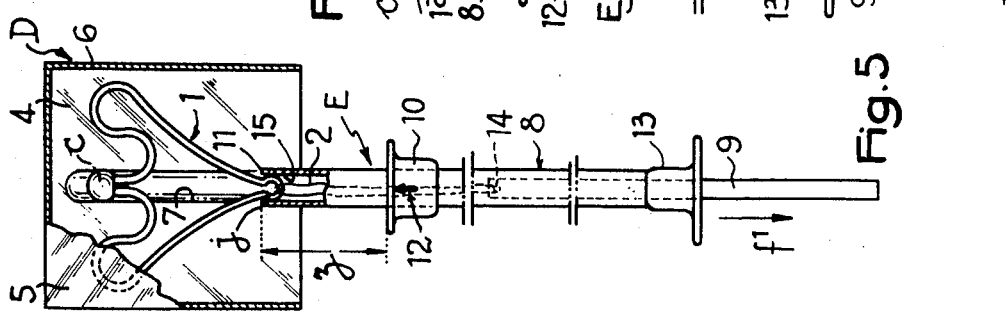
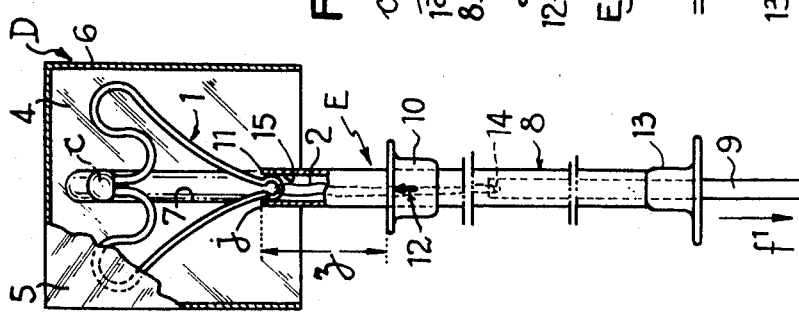

United States Patent Office 3,516,403
Patented June 23, 1970

3,516,403
INTRAUTERINE CONTRACEPTION DEVICE AND INSTRUMENT FOR PLACING THIS DEVICE IN POSITION
Rene Cournut, Bordeaux-Cauderan, France, assignor to Apamed Etablissement, Vaduz, Liechtenstein, a body corporate of Liechtenstein
Filed July 5, 1968, Ser. No. 742,903
Claims priority, application Switzerland, July 14, 1967, 10,103/67
Int. Cl. A61f 5/46
U.S. Cl. 128—130
10 Claims

ABSTRACT OF THE DISCLOSURE

Intrauterine contraception device comprising a moulded element of plastics material having a high elastic memory and a flat shape inscribed in an inverted isosceles triangle. The portion of the element adjacent the base of the triangle has the shape of a minute omega spread out inside the triangle. Two adjacent lateral portions, connected to the omega portion by open outwardly convex loop portions, unite at the corner of the triangle opposed to the omega portion and carry a flexible tie connected thereto. A bulge is provided on the outwardly facing point of the omega portion. An instrument is provided for fitting the device.

---

The present invention relates to intrauterine contraception devices or "sterilets."

It is known that all these intrauterine contraception devices consist of a neutral element usually of plastics material that the gynaecologist introduces into the uterus of the woman so as to achieve an acceleration of the vibrations of the tubes, and thus an increase in the speed of the travel of the ovule, which is such that the duration of the tubular travel is sufficiently reduced to no longer permit fertilization, since the ovule has not reached, before arriving in the uterus, a stage of maturity permitting the nidation.

Most intrauterine contraception devices consist of a filiform or thread-like element which is either wound in a spiral or bent in various ways, for example in the form of a double S, one of the ends being attached to a traction tie, whereas the other end is usually free.

These known devices have a number of drawbacks among which may be mentioned in particular the following:

The frequency of expulsion from the uterus, although low, is nonetheless excessively high and this is the main drawback, since the danger of expulsion of the device obliges the woman to submit to constant checking of its presence and the device necessarily has for this purpose a depending portion which permanently extends into the vagina through the cervical canal connecting the uterus to the vagina and this depending portion must be constructed, usually in a filiform manner, so as to avoid adversely affecting the necessary seal of the uterus;

The device very often lacks flexibility and capability of adaptation to the shapes of the uterus, it is consequently often the cause of traumatisms or pains with all the possible accompanying, sometimes very serious, drawbacks, bearing in mind that in many cases a prior hysterography is not made, it is difficult to know à priori exactly what is the calibre and shape of the device it is desirable to insert and this could result in its rejection after positioning or necessitate its extraction;

The material used heretofore in the construction of these devices usually consisted of a plastics material of low elastic memory so that the shape assumed by the device subsequent to manipulation for insertion in many cases no longer resembled the initial shape, which is the only effective one.

The object of the invention is to provide an improved intra-uterine contraception device which takes into account and remedies the drawbacks of known devices while it allows a permanent checking of its presence, though this checking is practically unnecessary since the device cannot be expelled, it being however possible for the gynaecologist to extract it.

The device according to the invention comprises, in combination, an endless moulded element of plastics material having a high elastic memory and a flat shape so that it is inscribed in an inverted isosceles triangle, its portion corresponding to the base of said triangle having the shape of a minute omega spread out inside the triangle and connected to the adjacent lateral portions by two open outwardly convex loops, the centre point of the omega portion facing outwardly and terminating in a spherical projecting portion constituting a bulge, and a flexible tie known per se secured to said element at the corner of said triangle facing said base portion.

Owing to this shape of the element, which is in fact a kind of endless ring and moreover to the high elastic memory of the plastics material of which it is composed, this element:

First, can be completely elongated by traction in opposite directions on the centre projecting portion of the omega portion and on the opposite corner of the element so that this element consists of two longitudinal juxtaposed portions interconnected by said projecting portion and said corner, which allows the passage of the device through the cervical canal;

Secondly, it automatically resumes its initial shape as soon as it has been urged inside the uterus, from which it can be removed only subsequent to a further elongation, any tendency on the part of the pointed end of the element to enter the cervical canal being followed by an automatic locking brought about by the closing of the lateral portions of the ring on the omega portion which, in remaining interposed therebetween, imparts to the element a width which greatly exceeds the width of the cervical canal.

Another object of the invention is to provide an instrument for positioning the aforementioned contraception device. This device comprises in combination an adaptor adapted to maintain the element of closed contour in its plane, while an elongating traction is being exerted thereon, and a positioning tool comprising the combination of a tube and a pull-push rod which is movable in said tube and provided at one end with an aperture for securing said rod to said flexible tie of the contraception device.

Further features and advantages of the invention will be apparent from the ensuing description with reference to the accompanying drawings.

In the drawings:

FIG. 5 is a front elevational view, with a part cut away, of the contraception device in position on an adaptor which forms part of the positioning instrument and is ready to be engaged in the positioning tube proper;

FIG. 6 is a view similar to FIG. 5 with a sectional view of the device elongated in the positioning tool;

FIG. 7 shows this tool partly engaged in the cervical canal of the uterus;

FIG. 8 is a similar view after extension of the elastic element in the uterus;

FIG. 9 is a similar view of the last operation, namely the severing of the tie connecting the element to the positioning tool;

FIG. 10 shows the contraception device automatically locked in position in the uterus;

FIG. 11 is a similar view showing the elongation of the elastic element of the device prior to its extraction by the gynaecologist;

FIG. 12 is a front elevational view of a modification of the adaptor;

FIG. 13 is a sectional view of the adaptor shown in FIG. 12 taken along line 13—13 of FIG. 12, and FIG. 14 is an end elevational view of the adaptor shown in FIG. 12.

Figure 1:
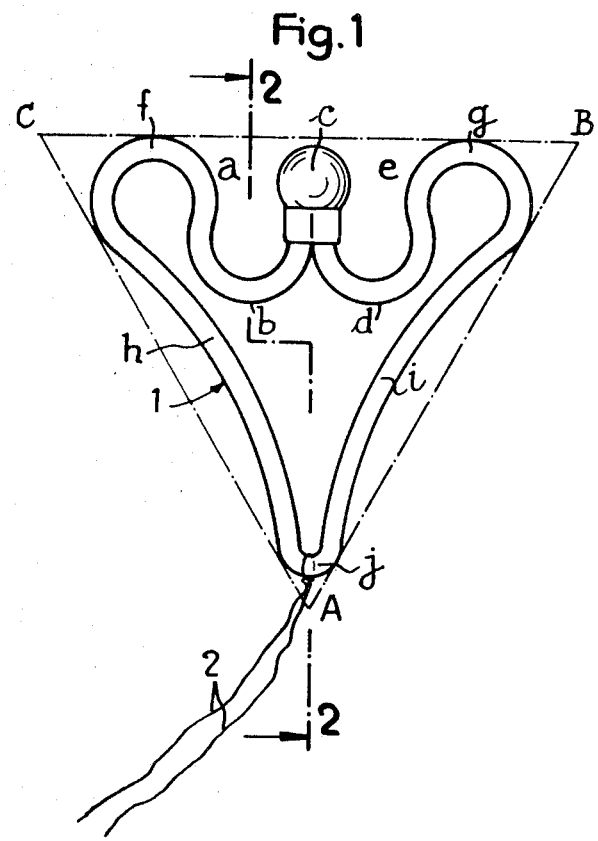
FIG. 1 is a front elevational view of a first device according to the invention.
Figure 2:
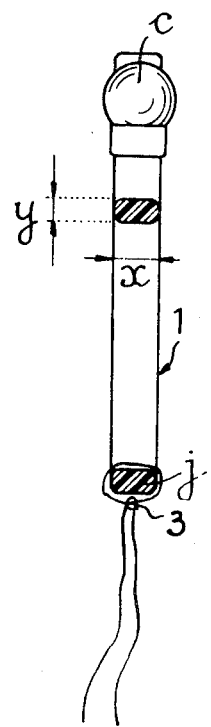
FIG. 2 is a sectional view thereof taken along line 2—2 of FIG. 1.

According to the embodiment shown in FIGS. 1 and 2, the intrauterine contrapection device comprises the combination of a flexible element 1 and a tie 2.

The element 1 is almost filiform or thread-like. It has a rectangular cross-sectional shape with rounded non-traumatising corners, as can be seen in FIG. 2. This sectional shape has a width $x$, perpendicular to the large sides of the element, of the order of 2–3 mm., and a thickness $y$ of the order of 1 mm. This element is closed onto itself and constitutes an endless ring inscribed in an inverted isosceles triangle which is preferably an equilateral triangle ABC. It is moulded in accordance with the shape shown in FIG. 1 so that on the base or side BC of the triangle it has the shape of a minute omega $abcde$, the two ends of the branches $ba$ and $de$ of this omega portion being connected by open outwardly convex loop portions $f$ and $g$ to lateral portions $h$ and $i$ which are connected by a narrow loop portion $j$ to the corner or angle A of the triangle.

It will be observed that the omega portion $abcde$ is completely extended inside the triangle and that its outwardly-facing median point terminates at $c$ in a projecting portion or bulge having a spherical or like shape.

This element 1 is of very flexible mouldable plastics material having a high elastic memory. Advantageously, an ethylene and vinylacetate copolymer can be employed, for example the product sold under the trademark Lupolen VKR 1187/130 (91–2–B) by the German company Badische Anilin und Soda Fabrik. However, use of this material is not intended to be exclusive.

Irrespective of the material employed, it is preferably produced in such manner that it can be located, for example:

By visibility in X-rays, the material employed being rendered opaque to these rays by the addition of a certain percentage, for example about 25%, of barium sulfate to the plastics material;

By detection with a Geiger counter owing to incorporation of a magnetic band in the plastics material.

The flexible tie is advantageously a nylon thread forming a knot at 3 around the corner $j$ of the element 1.

Figure 3:
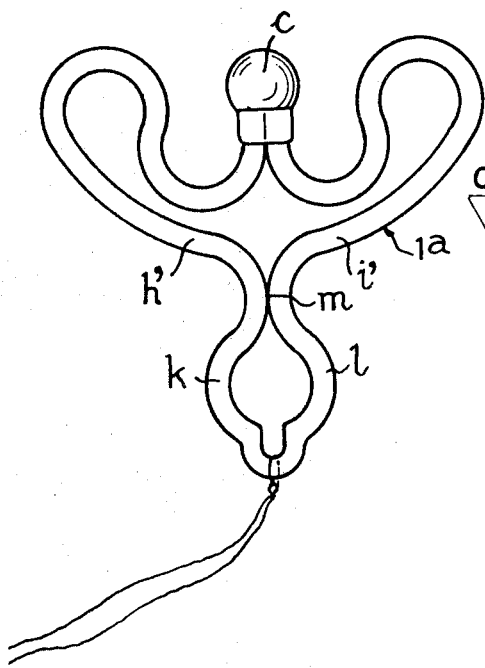
FIG. 3 is a view similar to FIG. 1 of a modification intended for an uterus having a large-size flared cervical canal.

FIG. 3 shows a modification of the device having an annular element 1ª which differs from the foregoing element only in that the two lateral branches or portions $h'$ and $i'$ are enlarged at $k$ and $l$ and interconnected at $m$ so as to improve their application in the large flared cervical canal of an uterus.

Figure 4:
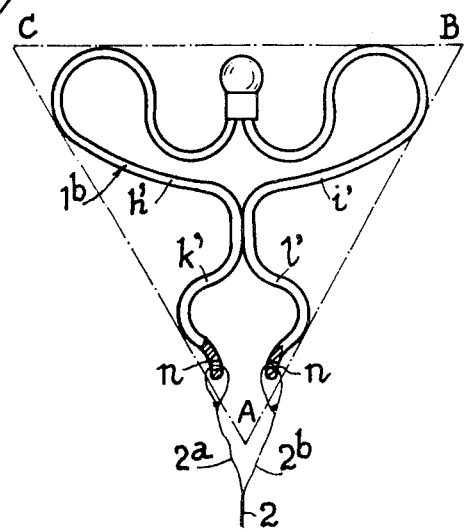
FIG. 4 is a view similar to FIG. 1 of another modification of the device.

FIG. 4 shows another modification 1ᵇ of the device which is derived from the preceding device but differs therefrom in that the enlarged portions are spaced from each other and provided near their free ends with a small orifice $n$ for securing one of the two branches 2ª and 2ᵇ into which the flexible tie 2 is divided.

FIGS. 5–9 show the positioning of any of the devices shown in FIGS. 1 and 2, 3 or 4, this positioning being achieved by means of an instrument consisting of the combination of an adaptor D and a positioning tool proper E.

The adaptor D consists of a flat-shaped case, preferably of transparent plastics material, comprising a base 4 and a top 5, the lateral walls 6 having a width just corresponding to the thickness $x$ (FIG. 2) of the element 1 so that this element can be inserted between the two walls 4 and 5, the spherical enlargement $c$ of the corner or point of the omega portion being engaged in recesses 7 which are in facing relation to each other and provided in the walls 4 and 5.

As will be understood, the element 1 is slidable between the two walls 4 and 5 with no possibility of transverse deformations which could impart thereto a poor elastic memory which would adversely affect, when positioning, its automatic subsequent extension in a single plane in the uterus.

The positioning tool proper E comprises the combination of a tube 8 and a push-pull rod 9. The tube 8 comprises an abutment 10 having a flange at a distance $z$ from its front end 11 which is at least equal to the greatest length of the cervical canal through which the element 1 must be introduced in the uterus. Preferably, this abutment comprises a reference mark 12 which enables the tool E to be oriented with reference to the large sides of the element 1.

Another abutment 13 is provided at the other end of the tube 8 to permit taking hold of this tube between the first and second fingers of one hand while the thumb of this hand can bear against the rod 9.

This rod 9 is slidable in the tube 8 and comprises near its front end an aperture 14 in which the end of the flexible tie 2 of the contraception device according to the invention can be secured by a knot.

With the element 1 engaged in the adaptor D and the rod 9 extending beyond the front end 11 of the tube 8, the tie 2 is secured by a knot in the aperture 14 of the rod 9 which is then shifted rearwardly into the tube. Thereafter, the front end 11 of this tube is engaged in the entrance 15 formed in the adaptor between the two walls 5 and 6 at the ends of the recesses 7 and 10. The various parts can then occupy the relative positions shown in FIG. 4.

The tube 8 and the adaptor D being held in one hand, the practitioner exerts with his other hand a traction on the rod 9 in the direction of arrow $f^1$ (FIG. 5) so as to exert a traction on the corner $j$ of the element 1 and cause it to progressively enter the tube 8 until the position of full introduction shown in FIG. 6 is reached. In this position the element 1 is fully elongated at 1′ and consists of two parallel rectilinear portions interconnected at their ends, only the spherical enlargement or bulge $c$ extending beyond the end 11 of the tube so as to cap the end of the tube. The adaptor D is then of no more use and can be stored away.

The assembly 1′–E is then ready for positioning the contraception device in the cavity $u$ of the uterus U. For this purpose, the practitioner presents the assembly 1′–E at the entrance of the cervical canal $v$ and inserts it in the latter. During insertion, the spherical enlargement $c$ facilitates the introduction and, as it covers the end of the tube 8, the latter can in no way wound the patient. The end of the insertion occurs when the abutment 10 comes in contact with the outer face $w$ of the neck of the uterus. Owing to the fact that the length $y$ exceeds that of the canal $v$, the spherical enlargement $c$ of the element 1 is already in the cavity $u$ of the uterus just after the passage of the isthmus of the cervical canal.

It is known that this cavity is flat-shaped and more or less triangular as shown in FIGS. 7–10, the tubes opening into this cavity in the corners (not shown) located toward the top and to the right and left of each of the figures.

The practitioner in holding the abutment 13 between the first and second fingers of one hand, has merely to urge the push-pull rod 9 in the direction of arrow $f^2$ with the thumb of the same hand so that this rod, after an inoperative travel corresponding to the length of the tie 2, abuts the end j of the elastic element 1' and gradually urges it out of the tube 8.

At a given moment, the spherical bulge c abuts against the base of the uterus with, however, no danger of wounding owing to its shape. As it issues from the cervical canal, the element 1 undergoes an extension owing to the elastic memory of the plastics material, the spherical bulge sliding to either the right or left. Finally, when the corner j has issued from the tube 8 (FIG. 8) and the two loop portions f and g undergo an extension or spread out, the element 1 has resumed its initial shape, the bulge c having returned to a position set back from the loop portions f and g.

It will be understood that the positioning tool must be suitably oriented so that the plane of the extension or spreading of the element 1 be at least approximately parallel to the superimposed adjacent wide faces of the cavity of the uterus. This can be easily achieved by the practitioner by means of the reference mark 12 which enables him to suitably orient the assembly 1'–E when he presents it in front of the canal v of the uterus.

Moreover, it will be observed that, owing to the extreme elasticity of the element 1, even a poor orientation of the tool E is of no great inconvenience since the element 1 spreads out in any case on condition that a slight twisting of the branch portions h and i occurs. This twisting automatically disappears as soon as the end loop portion j has left the tube 8.

Numerous tests carried out in the laboratory on transparent pockets identical to the uterus have indeed shown that the element 1 spreads in a very rational manner and is installed in the cavity without on any occasion occupying a false position.

Owing to its very great flexibility and to the fact that it is practically without tension, the element 1 can be adapted to the various shapes of uterine cavities and in particular to very different widths of uterus bases without producing an internal tension or force.

All uterine cavities are of course in a more or less great anteverted or retroverted position. Owing to its great flexibility, the device can bend in profile without being traumatising or causing the slightest pain.

With the element 1 in position, the tool E has now merely to be withdrawn from the canal v and the tie 2 severed by shears F at a suitable distance from the end of the neck of the uterus.

Once fitted, the element 1 is thenceforth trapped in the uterine cavity u and practically incapable of being expelled therefrom owing to spasms of the uterus or by a voluntary action by traction on the ends of the tie 2 (this traction enables the user to check that the device is still in position). Indeed, traction exerted on the tie 2 tends to engage the element 1 in the cervical canal v but, owing to the flat shape of the uterine cavity u, the element 1 remains plane and soon becomes wedged in this cavity (FIG. 10), the omega portion closing as shown and constituting a lock which prevents any further deformation, the small spherical enlargement c being trapped between the two loop portions f and g which are urged toward each other.

It is absolutely impossible for the device 1$^b$ shown in FIG. 4 to be expelled owing to the action of the two free ends of the branches k' and l' which become wedged in the manner of buttresses against the wall of the uterine cavity.

When it is needed or desired to remove the device, it must be removed by the gynaecologist. This removal operation requires the prior elongation of the element 1, 1$^a$ or 1$^b$ inside the uterus, which is achieved by means of a rod G which is introduced through the cervical canal v and bears against the lower face of the small spherical enlargement or bulge c in the centre of the omega portion while the practitioner exerts a traction on the tie 2, so that the element 1 (subjected to two tractions in opposite directions) is elongated and resumes inside the uterus and the canal v the shape it had inside the tube 8 when it was being placed in position in the uterus. The gynaecologist has now merely to exert a traction simultaneously on the assembly 2–G to extract the element 1 without difficulty.

In the case of the element 1$^b$ shown in FIG. 4, the traction on the tie 2 while the spherical enlargement c is held by the rod G urges the two ends of the branches k' and l' towards each other so that they cease to be wedged against the wall of the uterine cavity.

FIGS. 12–14 show a modification of the adaptor in which the recesses 7 guiding the small spherical enlargement or bulge c are extended at 7$^a$ in the form of two tabs 16 cut away from the adjacent portions of the walls 4 and 5 by longitudinal slots 17. These tabs have a certain elasticity and the distance therebetween is very slightly less than the diameter of the small spherical enlargement c of the element 1 (or 1$^a$ or 1$^b$) so that as this enlargement is engaged in these pinching means by a slight axial thrust on the element 1 exerted through the tube 8 (see FIG. 5) in which the enlargement is hardly engaged, when this element has a traction exerted thereon through the tie 2 for its introduction in the tube 8 by traction exerted on the rod 9 (FIG. 5) in the direction of arrow $f^1$, the spherical enlargement c will remain wedged in the pinching means in the course of this introduction so that the element 1 is prevented from temporarily assuming the position shown in FIG. 10. When this element 1 has assumed the rectilinear shape, the spherical enlargement c is disengaged from the pinching means so as to complete the engagement of the element in the tube 8 as shown in FIG. 6.

Although specific embodiments of the invention have been described, many modifications and changes may be made therein without departing from the scope of the invention as defined in the appended claims.

Having now described my invention, what I claim as new and desire to secure by Letters Patent is:

1. An intrauterine contraception device comprising in combination, an endless moulded element of plastics material having a high elastic memory and a flat shape inscribed in an inverted isosceles triangle, said element having a portion adjacent the base of said isosceles triangle and having the shape of a minute omega spread out inside the triangle, two adjacent lateral portions, two open outwardly convex loop portions connecting said omega portion to said lateral portions, the centre point of the omega portion facing outwardly and comprising at its outer end a substantially spherical projecting portion constituting a bulge, and a flexible tie secured to said element adjacent the corner of said triangle facing said base.

2. A device as claimed in claim 1, wherein said element is of an ethylene and vinylacetate copolymer including barium sulfate so that it is responsive to X-rays.

3. A device as claimed in claim 1, wherein said element is of a plastics material containing a magnetic band so that the element produces a Geiger counter response.

4. A device as claimed in claim 1, wherein said two lateral portions, which are interconnected at the corner of said triangle opposed to said omega portion, are enlarged in the vicinity of this corner and united on the side of the enlarged portions nearest said omega portion.

5. A device as claimed in claim 6, wherein said two lateral portions are united at a distance from the corner of said triangle opposed to said omega portion, said lateral portions having ends which are spaced apart and respectively connected by two flexible portions connected to said flexible tie.

6. An intrauterine contraception device comprising in combination, a moulded element of plastics material having a high elastic memory and a flat shape inscribed in an inverted isosceles triangle, said element having a portion adjacent the base of said isosceles triangle and having the shape of an omega, two adjacent lateral portions, two open outwardly convex loop portions connecting said omega portion to said lateral portions, the centre point of the omega portion facing outwardly and comprising at its outer end a bulge, and a flexible tie secured to said element adjacent the corner of said triangle facing said base.

7. An instrument for positioning the contraception device according to claim 6, said instrument comprising, in combination, an adaptor adapted to maintain said element in the plane of said element while an elongating traction is being exerted thereon, and a positioning tool comprising a tube and a push-pull rod which is movable in said tube and has at one end an aperture for securing said rod to said flexible tie of the contraception device, said tube being capable of receiving a part of said contraception device.

8. An instrument as claimed in claim 7, wherein said adaptor comprises a flat-shaped case having two wide walls defining a space whose width corresponds to the thickness of said element of said contraception device, and recesses in facing relation in said wide walls for allowing the sliding of said bulge of said omega portion.

9. An instrument as claimed in claim 8, comprising two tabs which extend said recesses and constitute pinching means for elastically retaining said bulge of said omega portion.

10. An instrument as claimed in claim 7, wherein said tube comprises an end capable of insertion in the cervical canal of a uterus, a first abutment located at a distance from said end of said tube and adapted to abut the outer face of the neck of the uterus, and a second abutment adapted to enable the practitioner to hold said tube between the first and second fingers of one hand without crushing the tube.

References Cited

UNITED STATES PATENTS

| | | | |
|---|---|---|---|
| 3,425,411 | 2/1969 | Robinson | 128—130 |
| 3,438,369 | 4/1969 | Burnhill | 128—130 |
| 3,457,915 | 7/1969 | Eshelman | 128—130 |

ADELE M. EAGER, Primary Examiner

U.S. Cl. X.R.

128—263